(12) United States Patent
Hsu

(10) Patent No.: US 7,623,117 B2
(45) Date of Patent: Nov. 24, 2009

(54) ADJUSTABLE MOUSE

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 582 days.

(21) Appl. No.: 11/501,568

(22) Filed: Aug. 9, 2006

(65) Prior Publication Data
US 2007/0035520 A1    Feb. 15, 2007

(30) Foreign Application Priority Data
Aug. 12, 2005 (TW) ............... 94127506 A

(51) Int. Cl.
*G06F 3/033* (2006.01)
(52) U.S. Cl. .................................. 345/163
(58) Field of Classification Search ......... 345/163–165; 463/37
See application file for complete search history.

(56) References Cited

U.S. PATENT DOCUMENTS

| | | | | |
|---|---|---|---|---|
| 5,847,696 A | * | 12/1998 | Itoh et al. ............... | 345/163 |
| 5,983,747 A | * | 11/1999 | Chen ...................... | 74/551.9 |
| 6,304,249 B1 | * | 10/2001 | Derocher et al. ....... | 345/163 |
| 2004/0020088 A1 | * | 2/2004 | Dana et al. ............ | 40/453 |
| 2004/0169640 A1 | * | 9/2004 | Chao et al. ............. | 345/163 |

* cited by examiner

*Primary Examiner*—Chanh Nguyen
*Assistant Examiner*—Kwang-Su Yang
(74) *Attorney, Agent, or Firm*—Quintero Law Office

(57) ABSTRACT

An adjustable mouse comprises a first shell, a second shell and a connecting assembly. The first shell movably connects to the second shell via the connecting assembly. The first shell moves relative to the second shell. When the length of the adjustable mouse is adjusted, the height of the adjustable mouse is simultaneously adjusted.

11 Claims, 5 Drawing Sheets

ADJUSTABLE MOUSE

BACKGROUND OF THE INVENTION

1. Field of the Invention

The invention relates to a mouse, and more particularly to a size adjustable mouse.

2. Description of the Related Art

A mouse is an input device for a computer. A conventional mouse has a uniform size and cannot be adjusted to fit the palm of an individual user. Thus, a conventional mouse cannot fit the palm of every user palm and use thereof may be uncomfortable. Not only input function but also human comfort is valued by a user and a mouse manufacturer.

BRIEF SUMMARY OF INVENTION

An adjustable mouse is provided. An exemplary embodiment of an adjustable mouse comprises a first shell, a second shell and a connecting assembly. The first shell movably connects to the second shell via the connecting assembly. The first shell moves relative to the second shell. When the length of the adjustable mouse is adjusted, the height of the adjustable mouse is simultaneously adjusted.

The first shell comprises a first groove and a second groove. The first groove comprises a first end and a second end. The second groove comprises a third end and a fourth end. The second shell comprises a first axle and the second axle. The first axle slides between the first end and the second end. The second axle slides between the third end and the fourth end. Thus, the first shell moves between a first position and a second position relative to the second shell for adjusting the size of the mouse. When the first shell moves between a first position and a second position relative to the second shell, an angle between the first shell and the second shell will change.

Note that the mouse further comprises a sensor. The sensor may be installed on the bottom of the first shell or the second shell.

The first groove and the second groove respectively comprise a skid-proof portion to prevent sudden sliding of the first axle and the second axle.

The mouse further comprises a first linkage, a second linkage, and an elastic element. The first linkage comprises a first connecting portion and a second connecting portion, wherein the first connecting portion is pivoted to the first shell. The second linkage comprises a third connecting portion and a fourth connecting portion, wherein the third connecting portion is pivoted to the second connecting portion, and the fourth connecting portion is pivoted to the second shell. The elastic element comprises a fifth connecting portion and a sixth connecting portion, wherein the fifth connecting portion connects to the second linkage, and the sixth connecting portion connects to the second shell. Thus, the effort required to adjust the mouse size is reduced due to the elasticity of the elastic element.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
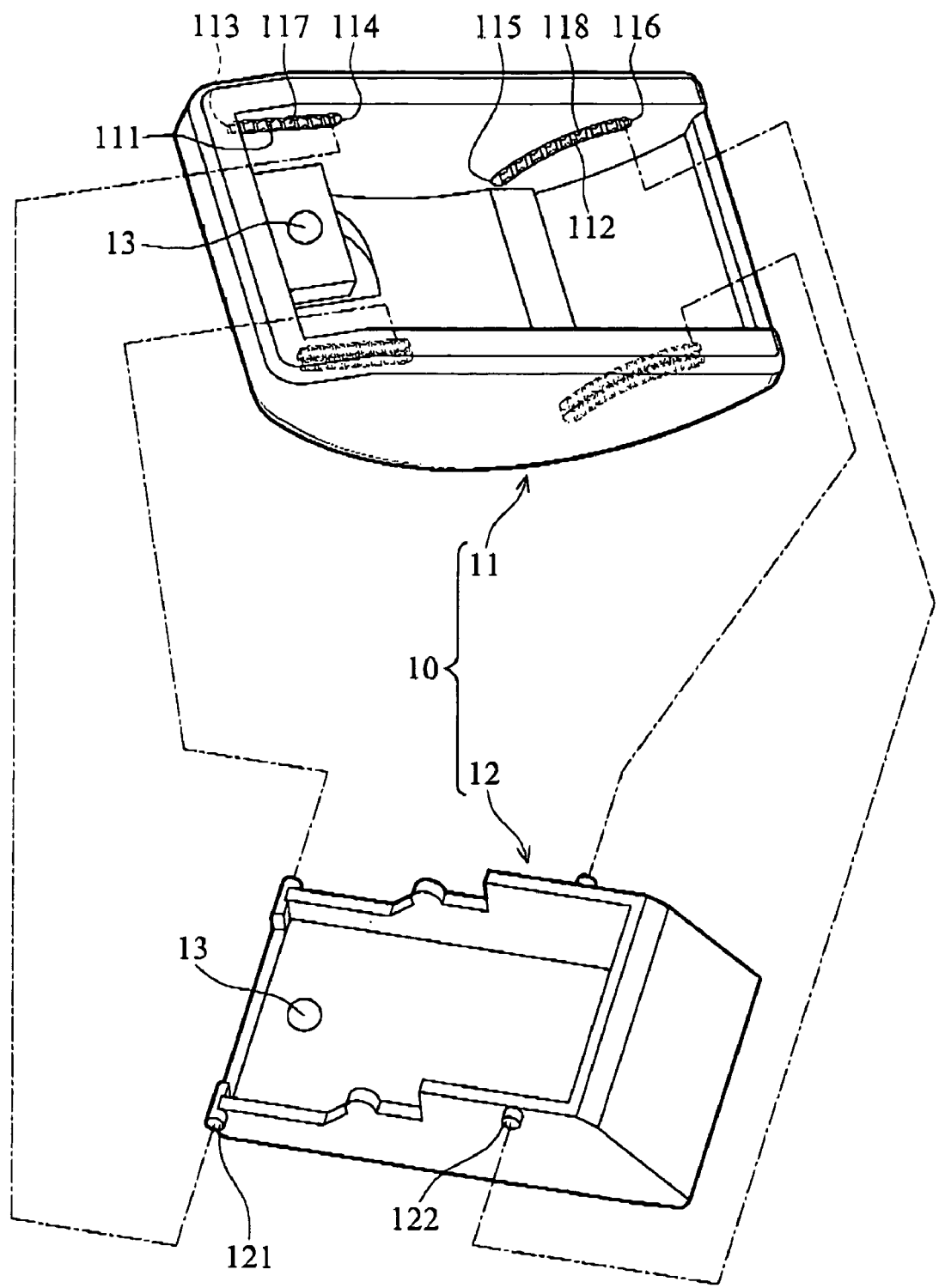
FIG. 1 is an exploded view showing an embodiment of an adjustable mouse of the invention.
Figure 2A:
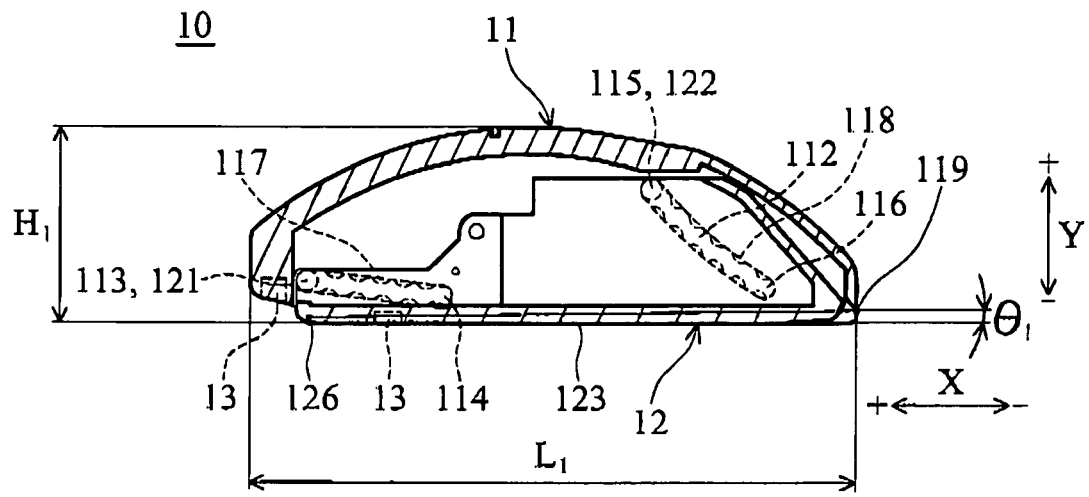
FIGS. 2A-2B show movement of a first shell of the adjustable mouse from a first position to a second position relative to a second shell according to FIG. 1.
Figure 2B:
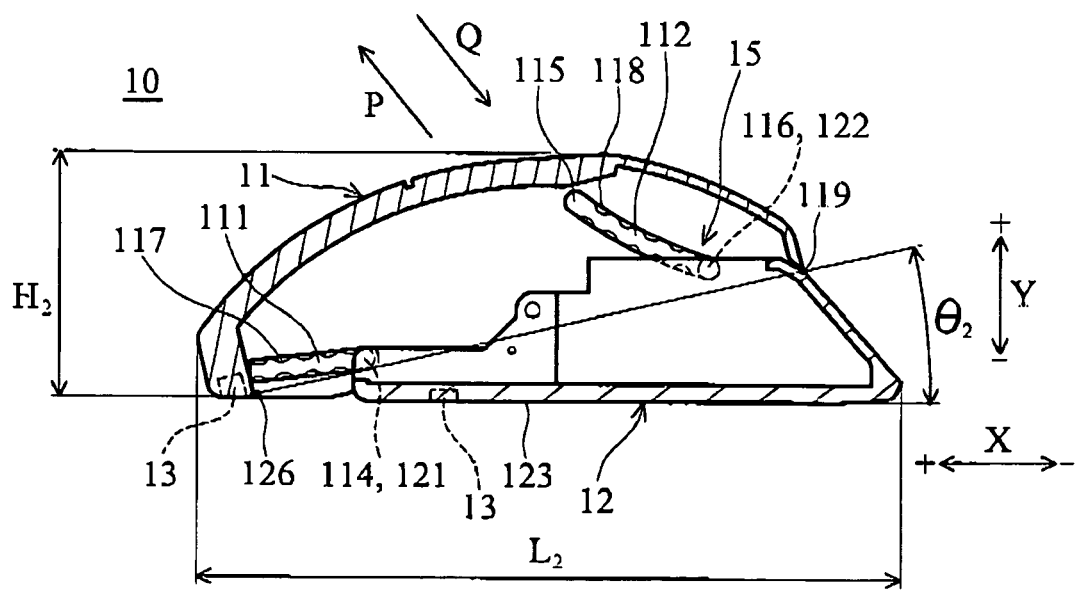

FIGS. 1, 2A and 2B, show an embodiment of an adjustable mouse 10 comprising a first shell 11, a second shell 12 and a connecting assembly. The first shell 11 connects to the second shell 12 and moves relative to the second shell 12 via the connecting assembly. The connecting assembly comprises a first groove 111, a second groove 112, a first axle 121 and a second axle 122. The first groove 111 and the second groove 112 are installed on the first shell 11, wherein the first groove 111 is not parallel to the second groove 112. The first groove 111 comprises a first end 113 and a second end 114. The second groove 112 comprises a third end 115 and a fourth end 116. The second shell 12 comprises the first axle 121 and the second axle 122. Because the first axle 121 slides between the first end 113 and the second end 114, and the second axle 122 slides between the third end 115 and the fourth end 116, the first shell 11 comprises a first position (shown in FIG. 2A) and a second position (shown in FIG. 2B) relative to the second shell 12. When the first axle 121 moves from the first end 113 to the second end 114, and the second axle 122 moves from the third end 115 to the fourth end 116, the first shell 11 moves from the first position to the second position relative to the second shell 12. When the first axle 121 moves from the second end 114 to the first end 113, and the second axle 122 moves from the fourth end 116 to the third end 115, the first shell 11 moves from the second position to the first position relative to the second shell 12.

The first shell 11 of the adjustable mouse 10 moves reciprocally in a first moving direction P, wherein the first moving direction is between a first direction (in this embodiment, a direction, +x, shows the first direction) and a second direction (in this embodiment, a direction, +y, shows the second direction). The first direction (+x) is perpendicular to the second direction (+y). When first shell 11 moves in the first moving direction P, the first shell 11 moves toward the second position. Conversely, the first shell 11 moves in a second moving direction Q, wherein the second moving direction Q is between a third direction opposite to the first direction (in this embodiment, a direction, −x, shows the third direction) and a fourth direction opposite to the second direction (in this embodiment, a direction, −y, shows the fourth direction). The third direction (−x) is perpendicular to the fourth direction (−y). When first shell 11 moves in the second moving direction Q, the first shell 11 moves toward the first position.

The first shell 11 further comprises a first end surface 119; the second shell 12 further comprises a bottom surface 123 and a second end surface 126. When the first shell 11 is located at the first position relative to the second shell 12, a first angle $\theta_1$ is formed between a line running from the first end surface 119 to the second end surface 126 and the bottom surface 123. When the first shell 11 is located at the second position relative to the second shell 12, a second angle $\theta_2$ is formed between a line running from the first end surface 119 to the second end surface 126 and the bottom surface 123. The second angle $\theta_2$ is wider than the first angle $\theta_1$. When the first shell 11 is located at the first position relative to the second shell 12; the adjustable mouse 10 has a first length $L_1$ and a first height $H_1$. When the first shell 11 is located at the second position relative to the second shell 12, the adjustable mouse 10 has a second length $L_2$ and a second height $H_2$. The second length $L_2$ is longer than the first length $L_1$. The second height $H_2$ is longer than the first height $H_1$.

The mouse 10 further comprises a sensor 13. The sensor 13 may be disposed on the first shell 11 or the bottom of the second shell 12. The first groove 111 and the second groove 112 respectively comprise skid-proof portions 117 and 118 to clip the first axle 121 to the second axle 122; thus, sudden sliding of the first axle 121 and the second axle 122 is prevented. Referring to FIG. 2B, the second groove 112 is a curve. When the first shell 11 moves to the second position, the second groove 112 comprises a first slope where the fourth end 116 connects to the second axle 122. When the second shell 12 moves to the first position, the second groove 112 comprises a second slope where the third end 115 connects to the second axle 122, wherein the second slope is steeper than the first slope. In other words, the second groove 112 near the fourth end 116 is smoothed. By designing the second slope to be steeper than the first slope, the second axle 122 provides a supporting force preventing the second axle 122 from sliding easily from the fourth end 116 to the third end 115 when the first shell 11 is moved in a vertical direction.

Figure 3:
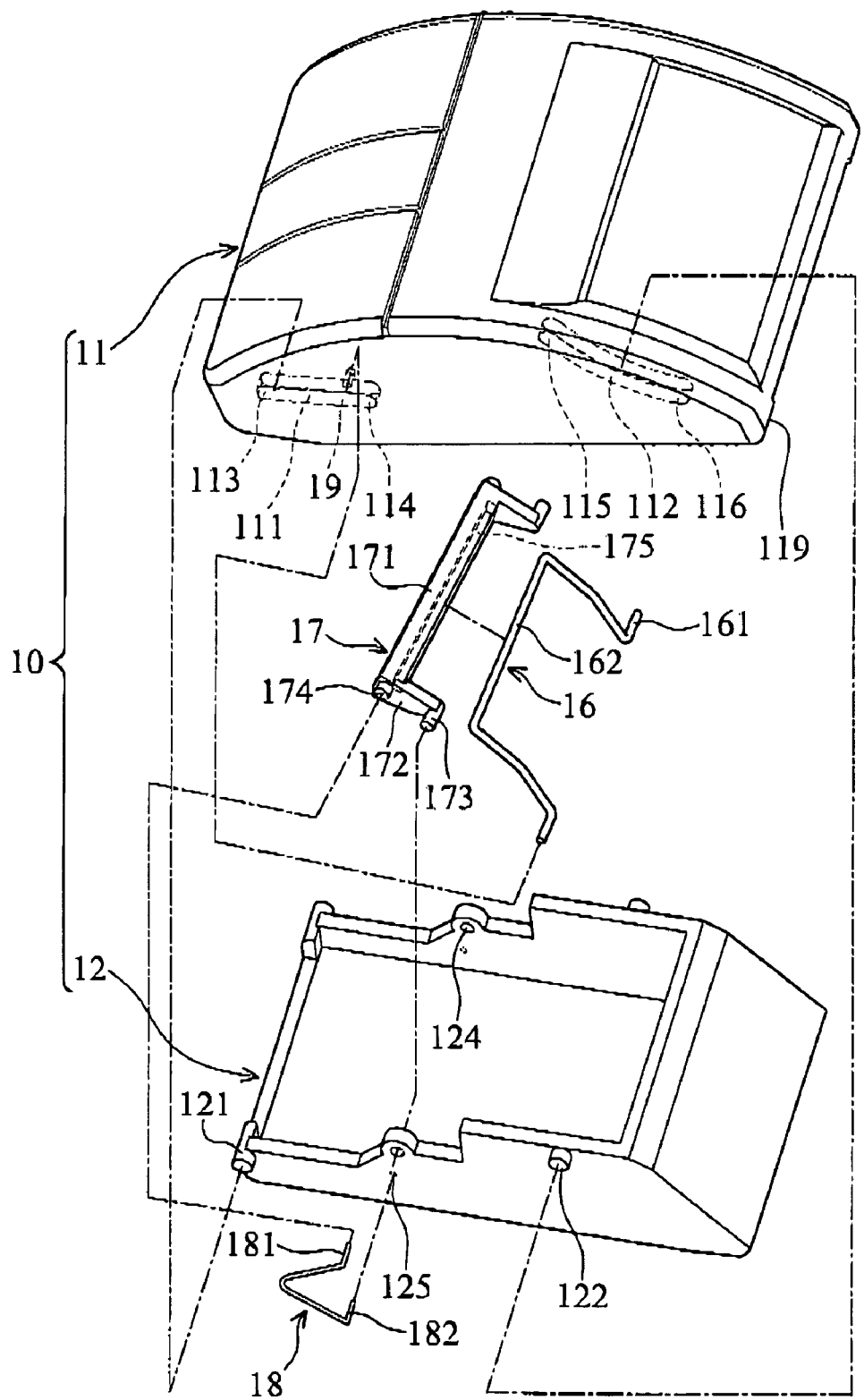
FIG. 3 is an exploded view showing an embodiment of an adjustable mouse of the invention.

FIG. 3 shows the adjustable mouse 10 further comprising a first linkage 16, a second linkage 17 and an elastic element 18. The first groove 111 is not parallel to the second groove 112. The first linkage 16 comprises two first connecting portions 161 and a second connecting portion 162. The first connecting portions 161 are respectively connected to two ends of the second connecting portion 162. The first connecting portions 161 are approximately perpendicular to the second connecting portion 162. The first connecting portions 161 are pivoted to the first shell 11 via a pair of holes 19 (FIG. 3 only shows one of the holes). The second linkage 17 comprises a third connecting portion 171 and two fourth connecting portions 172. The third connecting portion 171 comprises a depression 115 accommodating the second connecting portion 162 of the first linkage 16, wherein the first linkage 16 is pivoted to the second linkage 17. The fourth connecting portions 172 comprise a pair of holes 174 and a pair of protrusions 173. The protrusions 173 connect to a pair of holes 124, wherein the second linkage 17 is pivoted to the second shell 12. The elastic element 18 comprises a fifth connecting portion 181 and a sixth connecting portion 182. The second shell 12 further comprises a hole 125. The fifth connecting portion 181 is connected to the holes 174 and the sixth connecting portion 182 is connected to the hole 125, thus, the elastic element 18 is pivoted to the second linkage 17 and the second shell 12. Note that the elastic element 18 is V-shaped. The second linkage 17 is connected to the elastic element 18 and the first axle 121 slides in the first groove 111. Thus, the elastic, element 18 provides elasticity in a horizontal direction (+−x) allowing the first shell 11 of the mouse 10 to selectively slide toward the first position or the second position, wherein the direction of elasticity changes with the rotational direction of the second linkage 17.

Figure 4A:
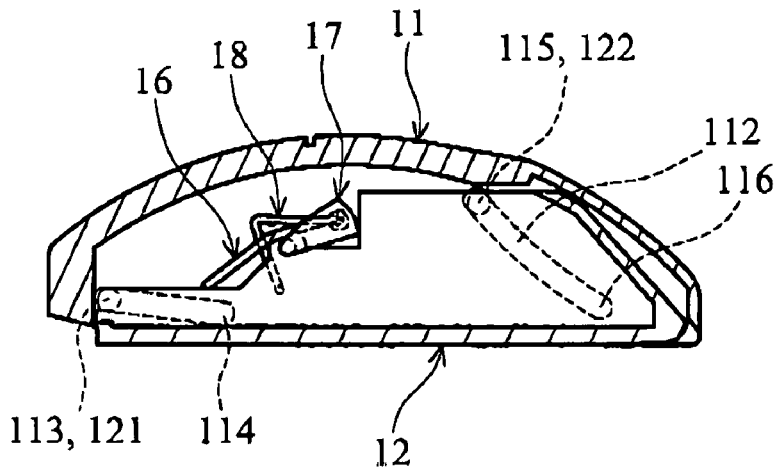
FIGS. 4A-4C show movement of a first shell of the adjustable mouse from a first position to a second position relative to a second shell according to FIG. 3.
Figure 4B:
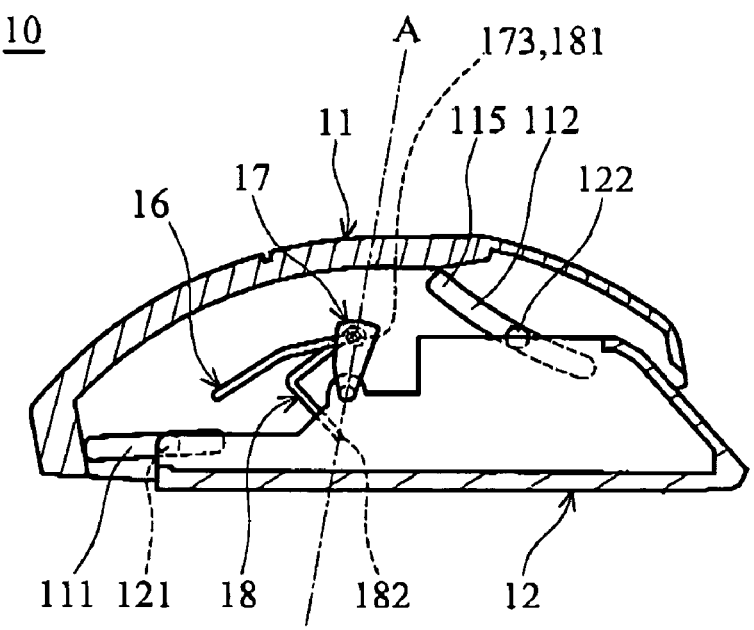
Figure 4C:
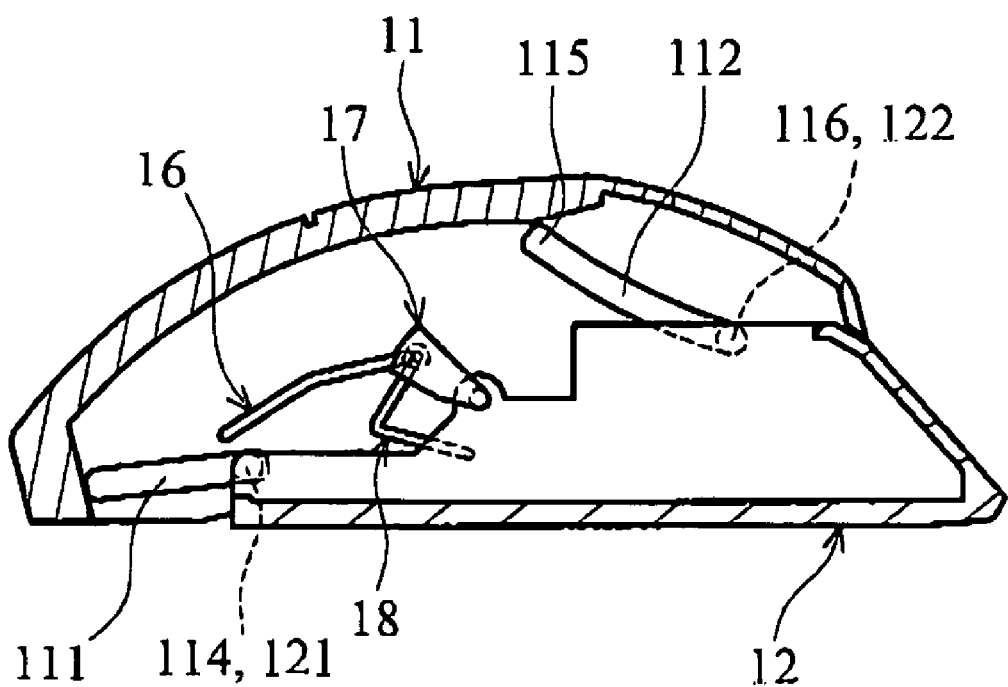

Please refer to FIGS. 4A to 4C, the first axle 121 moves between the first end 113 and the second end 114. The second axle 122 moves between the third end 115 and the fourth end 116. Thus, the first shell 11 comprises not only the first position (shown in FIG. 4A) and the second position (shown in FIG. 4C) but also a critical position (shown in FIG. 4B). When the first axle 121 slides from the first end 113 to the second end 114, and the second axle 122 slides from the third end 115 to the fourth end 116, the first shell 11 moves from the first position to the second position relative to the second shell 12. In the process of moving, the first shell 11 pulls the first linkage 16, to pull the second linkage 17, to rotate the elastic element 18. When the protrusion 173 of the fourth connecting portion 172, the fifth connecting portion 181 and the sixth connecting portion 182 are arranged in an approximately straight line (line A shown in FIG. 4B), the first shell 11 is located at a critical position relative to the second shell 12. When the first shell 11 passes through the critical position from the first position, the elastic element 18 provides an elasticity causing the sliding movement of first axle 121 and second axle 122 to respectively accelerate toward the second end 114 and the fourth end 116, thus, first shell 11 arrives at the second position. Conversely, when the first shell 11 passes through the critical position from the second position, the elastic element 18 provides an elasticity causing the sliding movement of the first axle 121 and the second axle 122 to respectively accelerate toward the first end 113 and the third end 115. Thus, when the size of mouse 10 is adjusted, the first shell 11 moves reciprocally between the first position and the second position at different velocity, enhancing user comfort. Note that the elastic element 18 may be a V-shape or straight line.

The invention provides an adjustable mouse. The mouse size can be adjusted to fit the palm of a user palm. Moreover, the adjustable mouse 10 comprises first linkage 16, second linkage 17 and elastic element 18 reducing the effort required for mouse adjustment.

While the invention has been described by way of example and in terms of the preferred embodiments, it is to be understood that the invention is not limited to the disclosed embodiments. To the opposite, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustable mouse, comprising:
   a first shell, comprising a first groove, wherein the first groove comprises a first end and a second end;
   a second shell, comprising a first axle sliding between the first end and the second end, wherein when the first axle is located at the first end, the adjustable mouse comprises a first length; when the first axle is located at the second end, the adjustable mouse comprises a second length; the second length is longer than the first length;
   a first linkage, comprising a first connecting portion and a second connecting portion, wherein the first connecting portion is pivoted to the first shell;
   a second linkage, comprising a third connecting portion and a fourth connecting portion, wherein the third connecting portion is pivoted to the second connecting portion, and the fourth connecting portion is pivoted to the second shell; and
   an elastic element, comprising a fifth connecting portion and a sixth connecting portion, wherein the fifth connecting portion connects to the second linkage, and the sixth connecting portion connects to the second shell;
   wherein the elastic element provides an elasticity allowing the first axle to slide toward the first end and the second end selectively.

2. The adjustable mouse as claimed in claim 1, wherein when the fourth connecting portion, the fifth connecting portion and the sixth connecting portion are arranged in a straight line, the first axle in the first groove is located at a critical position; when the first axle slides from the second end to the first end and passes through the critical position, the elastic element provides an elasticity to make the first axle slide toward the first end; when the first axle slides from the first end to the second end and passes through the critical position, the elastic element provides an elasticity allowing the first axle to slide toward the second end.

3. The adjustable mouse as claimed in claim 1, wherein the first shell further comprises a second groove, and the second shell further comprises a second axle sliding along the second groove; the second groove is not parallel to the first groove; the second groove comprises a third end and a fourth end; when the second axle is located at the fourth end, the mouse comprises a first height; when the second axle is located at the third end, the mouse comprises a second height; the second height is higher than the first height.

4. The adjustable mouse as claimed in claim 3, wherein the second groove is curved, the curved second groove becomes smooth near the fourth end.

5. The adjustable mouse as claimed in claim 1, wherein the elastic element is V-shaped.

6. The adjustable mouse as claimed in claim 1, wherein the elastic element comprises a spring.

7. An adjustable mouse, comprising:

a first shell;

a connecting assembly;

a second shell, connecting to the first shell via the connecting assembly, sliding axially relative to the first shell, and moving to a first position and a second position selectively, wherein when the second shell is located at the first position, the adjustable mouse comprises a first length; when the second shell is located at the second position, the adjustable mouse comprises a second length; the second length is longer than the first length;

a first linkage, comprising a first connecting portion and a second connecting portion, wherein the first connecting portion is pivoted to the first shell;

a second linkage, comprising a third connecting portion and a fourth connecting portion, wherein the third connecting portion is pivoted to the second connecting portion, and the fourth connecting portion is pivoted to the second shell; and an elastic element, comprising a fifth connecting portion and a sixth connecting portion, wherein the fifth connecting portion connects to the second linkage, and the sixth connecting portion connects to the second shell;

wherein the elastic element provides an elasticity allowing the second shell to slide toward the first position and the second position selectively.

8. The adjustable mouse as claimed in claim 7, wherein when the fourth connecting portion, the fifth connecting portion and the sixth connecting portion are arranged on a straight line, the first shell comprises a critical position relative to the second shell; when the first shell slides from the second position to the first position and passes through the critical position, the elastic element provides an elasticity allowing the second shell to slide toward the first position; when the first shell slides from the first position to the second position and passes through the critical position, the elastic element provides an elasticity allowing the second shell to slide toward the second position.

9. The adjustable mouse as claimed in claim 7, wherein the connecting assembly comprises a first groove, a second groove, a first axle and a second axle; the first groove and the second groove are installed on the first shell or the second shell, and the first axle and the second axle are installed on the first shell and the second shell; the first axle slides in the first groove and the second axle slides in the second groove.

10. The adjustable mouse as claimed in claim 7, wherein the elastic element is V-shaped.

11. The adjustable mouse as claimed in claim 7, wherein the elastic element comprises a spring.

* * * * *